(12) United States Patent  (10) Patent No.: US 7,893,577 B2
Binder et al.  (45) Date of Patent: Feb. 22, 2011

(54) ROTOR FOR AN ELECTRODYNAMIC MACHINE

(75) Inventors: Susanne Binder, Wettingen (CH); Josef Schwanda, Lupfig (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/570,139

(22) Filed: Sep. 30, 2009

(65) Prior Publication Data

US 2010/0072839 A1 Mar. 25, 2010

Related U.S. Application Data

(63) Continuation of application No. PCT/EP2008/05203, filed on Mar. 18, 2008.

(30) Foreign Application Priority Data

Mar. 30, 2007 (DE) .................. 10 2007 017 537
Nov. 7, 2007 (DE) .................. 10 2007 000 636

(51) Int. Cl.
*H02K 1/32* (2006.01)
(52) U.S. Cl. .................... 310/61; 310/65; 310/216.004
(58) Field of Classification Search .................. 310/61, 310/65
See application file for complete search history.

(56) References Cited

U.S. PATENT DOCUMENTS

| 677,836 | A | | 7/1901 | Wright |
| 2,773,203 | A | | 12/1956 | Opel et al. |
| 2,944,171 | A | * | 7/1960 | Alger .......................... 310/211 |
| 3,590,208 | A | * | 6/1971 | Martini et al. ................. 219/92 |
| 3,684,906 | A | * | 8/1972 | Lenz ........................... 310/61 |
| 4,301,386 | A | * | 11/1981 | Schweder et al. .............. 310/59 |
| 4,362,959 | A | | 12/1982 | Bartheld et al. |
| 4,362,960 | A | | 12/1982 | Gillet |
| 4,395,816 | A | * | 8/1983 | Pangburn ...................... 29/598 |
| 5,635,785 | A | | 6/1997 | Schwanda et al. |
| 5,789,833 | A | * | 8/1998 | Kinoshita et al. ............. 310/64 |
| 5,814,910 | A | | 9/1998 | Pelletier |
| 6,091,168 | A | * | 7/2000 | Halsey et al. ......... 310/216.107 |
| 6,583,526 | B2 | | 6/2003 | Griffith et al. |
| 7,190,094 | B2 | * | 3/2007 | Mayor ......................... 310/61 |
| 7,692,352 | B2 | * | 4/2010 | Sirois .................. 310/216.004 |
| 2004/0222711 | A1 | | 11/2004 | Klimt |

FOREIGN PATENT DOCUMENTS

EP 0736953 A2 10/1996

(Continued)

OTHER PUBLICATIONS

International Search Report for PCT/EP2008/053203, mailed on Dec. 19, 2008.

*Primary Examiner*—Burton Mullins
(74) *Attorney, Agent, or Firm*—Leydig, Voit & Mayer, Ltd.

(57) ABSTRACT

A rotor for an electrodynamic machine includes a laminated core having a plurality of lamination segments arranged in series in an axial direction, wherein the laminated core includes cooling ducts formed by duct spacers disposed between axially adjacent lamination segments, wherein the duct spacers are configured to resist centrifugal forces acting on the duct spacers and are supported by axial bolts extending through the laminated core in the axial direction.

19 Claims, 3 Drawing Sheets

FOREIGN PATENT DOCUMENTS

| | | |
|---|---|---|
| EP | 0893871 A2 | 1/1999 |
| GB | 30233 | 8/1911 |
| GB | 2419475 A | 4/2006 |
| JP | 54127512 A | 10/1979 |
| JP | 58165640 A | 9/1983 |
| JP | 05137282 A | 6/1993 |

* cited by examiner

ROTOR FOR AN ELECTRODYNAMIC MACHINE

This application is a continuation application of International Application No. PCT/EP2008/053203, filed on Mar. 18, 2008, which claims priority to German Application Nos. DE 10 2007 017 537.1 and DE 10 2007 000 636.7, filed on Mar. 30, 2007 and Nov. 7, 2007, respectively. The entire disclosure of the applications is incorporated by reference herein.

The invention relates to the field of electric machines. It refers to a rotor for an electrodynamic machine.

BACKGROUND OF THE INVENTION

Stator and rotor cores of electrodynamic machines, such as generators, in most cases are formed as laminated cores which comprise lamination stacks of individual lamination segments, which stacks are held together with bolts. Slots which extend in the axial direction for accommodating the corresponding windings are arranged in the laminated cores on the inner or outer periphery. The rotor of such a machine is described for example in EP-A2-0 736 953.

In the case of high-performance machines, by inserting duct spacers between adjacent stack sections of the laminated core, radial cooling ducts are formed, through which a suitable cooling medium, for example cooling air, flows in order to dissipate the heat which ensues in the winding or in the laminated core during operation.

Conventional duct spacers for stators, as are known for example from publications EP-A2-0 893 871 or U.S. Pat. No. 4,362,960 or U.S. Pat. No. 6,583,526, are normally produced as double-T or rectangular profiles consisting of steel, non-magnetic steel or aluminum and are fastened on the lamination segments by means of spot-welding or adhesive bonding.

For fast-rotating laminated cores of rotors, adhesive bonding or spot-welding of the duct spacers no longer suffices on account of the high centrifugal forces.

SUMMARY OF THE INVENTION

An aspect of the present invention is to provide a rotor of the type referred to the introduction, the duct spacers of which are protected in a simple way against a harmful influence of the centrifugal forces which occur during operation.

The duct spacers, in order to resist centrifugal forces which act upon them, are supported on bolts which extend through the laminated core of the rotor in the axial direction. As a result of this, a fastening of the spacer elements on the laminated core results which safely withstands the largest centrifugal forces which occur.

According to one embodiment of the invention, the duct spacers extend essentially in the radial direction.

Another development of the invention is characterized in that at least some of the duct spacers are formed in one piece and have a constant thickness, wherein the duct spacers of constant thickness are especially cut out of a metal sheet. The one-piece duct spacers preferably comprise in each case a widened first section which has at least one hole for inserting the axial bolts of the laminated core, and also a narrow second section in the form of a radial finger.

Another development of the invention is characterized in that at least some of duct spacers are assembled in each case from a plurality of individual parts which at least partially lie one above the other, wherein the duct spacers which are assembled from a plurality of individual parts which at least partially lie one above the other preferably have the same thickness in the regions in which the individual parts lie one above the other.

The assembled duct spacers preferably comprise in each case an upper part and a lower part which have in each case a widened first section with a hole for inserting the axial bolts of the laminated core, and also a narrow second section in the form of a radial finger, wherein the two parts with the first section and the hole arranged therein lie one above the other, while the fingers lie next to each other in a spaced apart manner.

For adjusting to the overall thickness of the two first sections which lie one above the other the fingers especially have double thickness compared with the first sections.

For doubling the thickness, in this case strip-like layers can be arranged on the fingers.

Another development is characterized in that the assembled duct spacers comprise in each case an upper part and a lower part, in that one of the two parts has a widened first section with a hole for inserting the axial bolts of the laminated core, and also two narrow second sections in the form of radial fingers which lie next to each other in a spaced manner, in that the other of the two parts is formed as a perforated disk, and in that the perforated disk and the first section with the hole arranged therein lie one above the other, wherein for adjusting to the overall thickness of the first section and perforated disk which lies upon it the fingers have double thickness compared with the first section.

For doubling the thickness, strip-like layers can especially be arranged on the fingers.

A further development of the invention is characterized in that radial slot-like cut-outs are arranged on the outer periphery of the lamination segments, which in the case of laminated cores form the winding slots, and in that the duct spacers extend in the radial direction up to and between the slot-like cut-outs.

Furthermore, it is advantageous if the duct spacers, for the support on the bolts, are additionally connected to the lamination segment by means of welding, spot-welding or pinning.

BRIEF DESCRIPTION OF THE DRAWINGS

The invention is to be subsequently explained in more detail based on exemplary embodiments in conjunction with the drawing. In the drawing.

DETAILED DESCRIPTION

Figure 1:
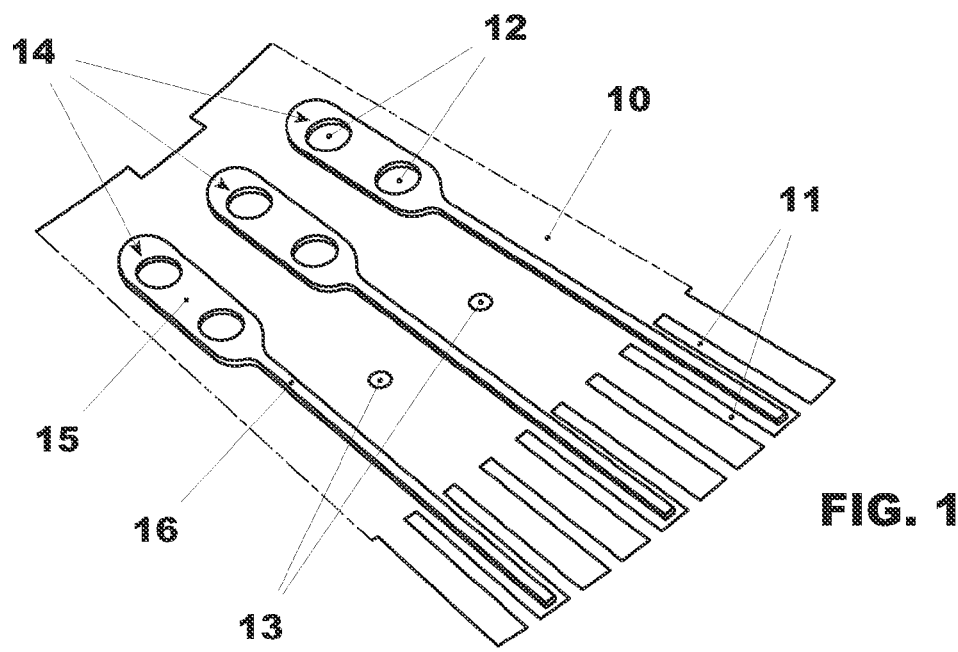
FIG. 1 shows in a perspective view a rotor lamination segment with single-finger duct spacers supported on bolts, according to a first exemplary embodiment of the invention.

In FIG. 1, in a perspective view, a rotor lamination segment 10 with single-finger duct spacers 14 supported on bolts according to a first exemplary embodiment of the invention is shown. The lamination segment 10 has the shape of a circle segment and on the outer periphery has a number of radial slot-like cutouts 11 which, when the rotor laminated core is complete, form the axial slots for accommodating the rotor winding. Furthermore, bolt-holes 12 and 13 are provided in the lamination segments 10 on a plurality of concentric diameter circles, which serve in the laminated core for inserting corresponding bolts, as is shown in publication EP-A2-0 736 953 which is referred to in the introduction. The large bolt-holes 12 are provided for so-called rim bolts, the small bolt-holes 13 being provided for clamping bolts.

A plurality of duct spacers 14, three in the example of FIG. 1, are attached in radial alignment on the upper side of the lamination segment 10 and constructed in one piece, and for example are cut out from a metal sheet by means of a laser. The duct spacers 14 are formed so that both axial clamping and optimum air guiding are ensured. The duct spacers 14 are supported against the (radial) centrifugal forces, which occur during operation, on the rim bolts which are inserted in the bolt-holes 12. This is achieved by the duct spacers 14 comprising a widened first section 15 on the inner end in each case, which has two holes in series in the radial direction which correspond to the bolt-holes 12 of the lamination segment 10. In the laminated core the rim bolts therefore extend through the holes in the section 15 of the duct spacers 14 and securely fix them.

Oriented outwards in the radial direction, the first or hole section 15 merges into a narrow radial finger 16 which extends between adjacent slot-like cut-outs 11 up to the outer edge of the lamination segment 10. Between adjacent duct spacers 14 or fingers 16 radial ducts are thus formed in the laminated core, through which cooling air or another cooling medium can flow. The duct spacers 14 in this example have the same thickness overall. They are preferably lasered or else otherwise solidly machined from steel, antimagnetic steel, or aluminum.

In the example of FIG. 1, the duct spacers 14 have a relatively large distance from each other in the region of the slot-like cutouts 11: only every third tooth (region between adjacent slot-like cutouts 11) of the lamination segment 10 supports the finger 16 of a duct spacer 14. In order to achieve here a much finer division of the cooling ducts, additional duct spacers can be inserted, as are reproduced in detail in FIGS. 2 to 5 in the respective sub-figure (a).

The additional duct spacers 17, 24, 27, 32 all have the same pincer-like basic shape, that is to say a widened inner section 20, 20' in which a bolt-hole 21 is provided which corresponds to the bolt-hole 13, and also two spaced-apart fingers 22, 23 which extend from this section 20, 20' in the radial direction. As is apparent from the sub-figures (b) of FIGS. 2-5, the two fingers 22, 23 of the additional duct spacers 17, 24, 27, 32 also extend through between adjacent slot-like cutouts 11 up to the outer edge of the lamination segment 10. In this way each slot-like cutout 11 is bordered on its two longitudinal sides by a finger in each case.

The additional duct spacers 17, 24, 27, 32 are assembled in each case from a plurality of individual parts 18, 19 (FIG. 2) or 18, 19, 25, 26 (FIG. 3) or 28, 29; 30, 31 (FIGS. 4 and 5) which at least partially lie one above the other. The duct spacers 17, 24, 27, 32 which are assembled from a plurality of individual parts 18, 19; 25, 26; 28, 29; 30, 31 which at least partially lie one above the other have the same thickness in the regions in which the individual parts 18, 19; 25, 26; 28, 29; 30, 31 lie one upon the other, which corresponds to the thickness of the other duct spacers 14.

Figure 2A:
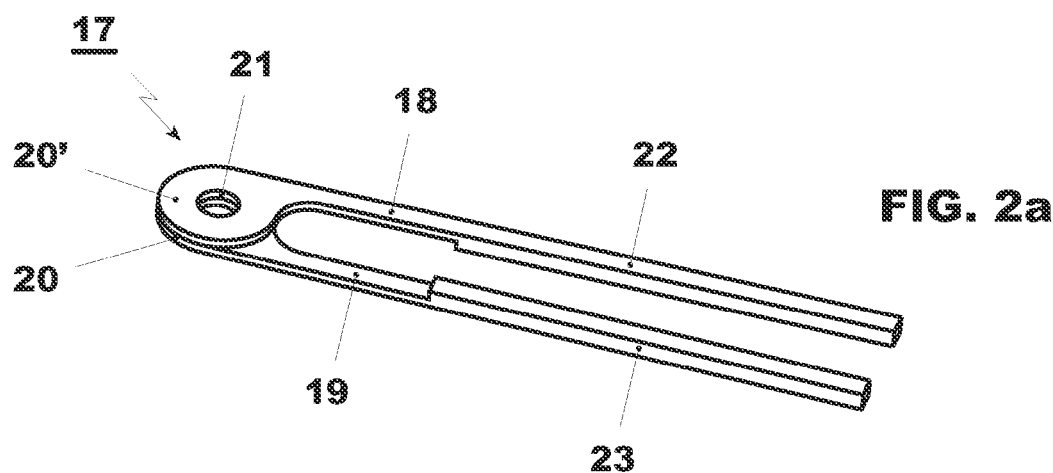
FIG. 2 shows in two sub-FIGS. 2(a) und 2(b) in perspective view an individual double-finger duct spacer of a first type (FIG. 2a), and also a corresponding rotor lamination segment with single-finger and double-finger duct spacers (FIG. 2b) supported on bolts, according to a second exemplary embodiment of the invention.
Figure 3A:
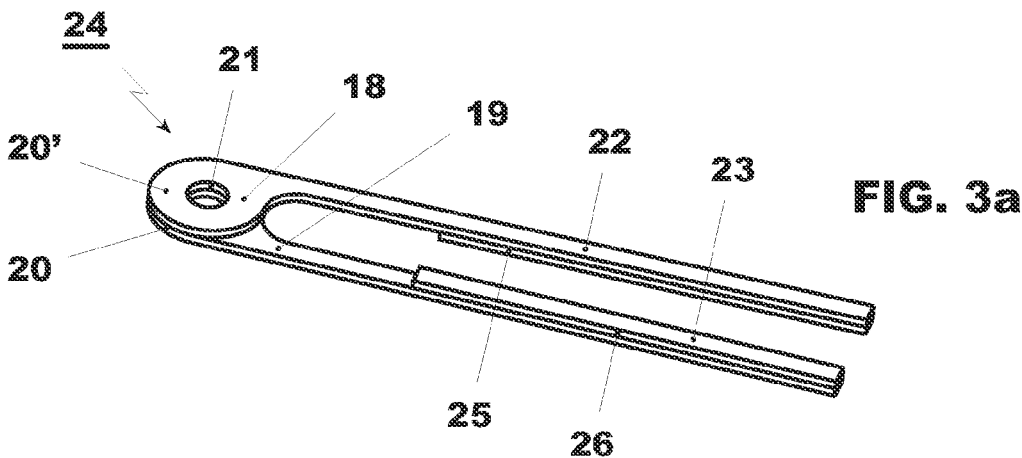
FIG. 3 shows in two sub-FIGS. 3(a) und 3(b) in perspective view an individual double-finger duct spacer of a second type (FIG. 3a), and also a corresponding rotor lamination segment with single-finger and double-finger duct spacers (FIG. 3b) supported on bolts, according to a third exemplary embodiment of the invention.

In the case of the exemplary embodiments of FIGS. 2(a) and 3(a), the assembled duct spacers 17 or 24 comprise in each case an upper part 18 and a lower part 19 which have in each case a widened first section 20 or 20' with a hole 21 for inserting the axial bolts of the laminated core, and also a narrow second section in the form of a radial finger 22 or 23. Upper part and lower part 18 or 19 are arranged in relation to each other like the legs of dividers, wherein the bolt-holes 21 of the two parts lie one above the other and form the axis of the dividers. The fingers 22, 23 are constructed with double thickness compared with the first sections 20, 20' for adjusting to the overall thickness of the two first sections 20, 20' which lie one above the other.

Figure 2B:
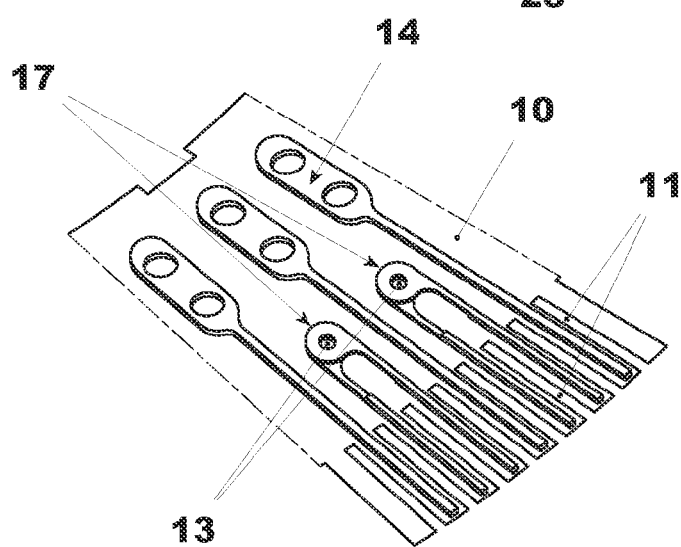

In the case of the embodiment which is shown in FIG. 2, the height of the fingers 22, 23 is altered in addition, which in the case of the upper part 18 increases downwards and in the case of the lower part 19 increases upwards. As a result of this, the height offset between the two fingers 22, 23 is compensated.

Figure 3B:
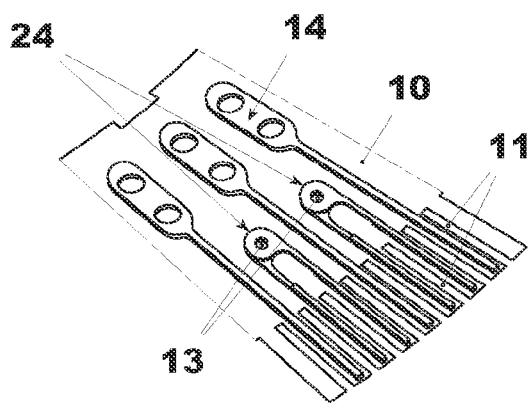

In the case of the embodiment which is shown in FIG. 3, for doubling the thickness strip-like layers 25, 26 are arranged on the fingers 22, 23, wherein the layer 25 is applied on the lower side in the case of the upper part 18 and the layer 26 is applied on the upper side in the case of the lower part 19.

Figure 4A:
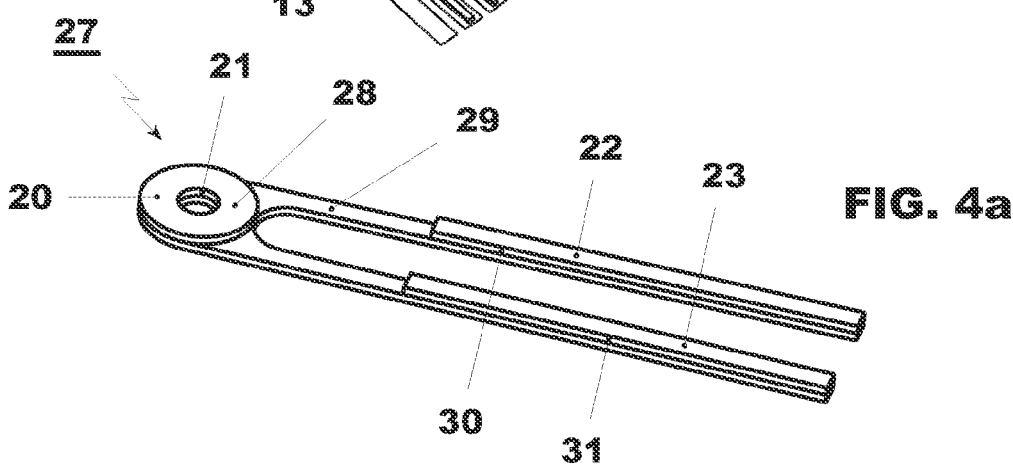
FIG. 4 shows in two sub-FIGS. 4(a) und 4(b) in perspective view an individual double-finger duct spacer of a third type (FIG. 4a), and also a corresponding rotor lamination segment with single-finger and double-finger duct spacers (FIG. 4b) supported on bolts, according to a fourth exemplary embodiment of the invention.
Figure 4B:
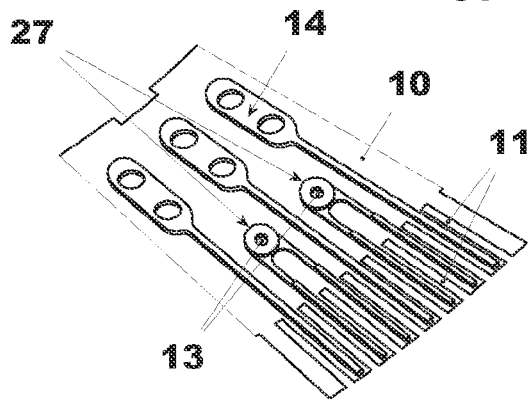
Figure 5A:
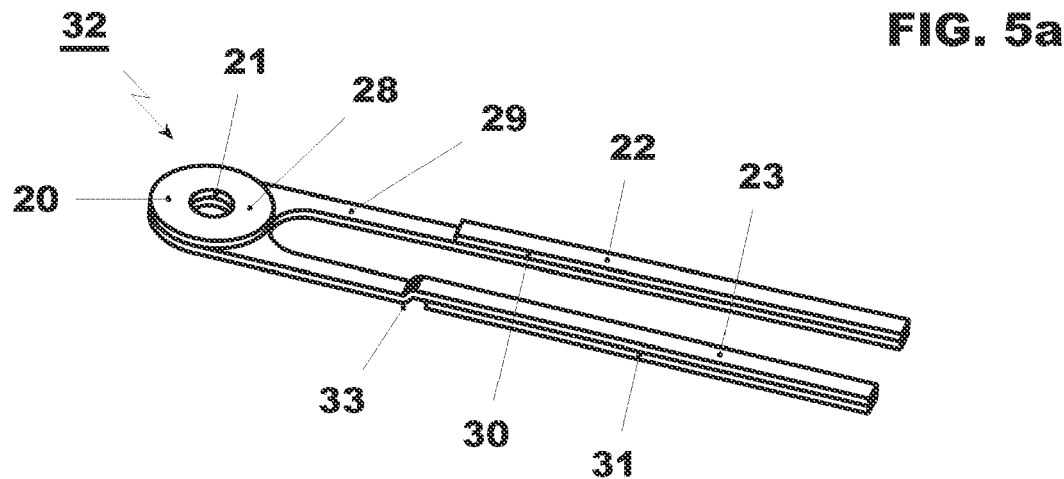
FIG. 5 shows in two sub-FIGS. 5(a) und 5(b) in perspective view an individual double-finger duct spacer of a first type (FIG. 5a), and also a corresponding rotor lamination segment with single-finger and double-finger duct spacers (FIG. 2b) supported on bolts, according to a second exemplary embodiment of the invention.
Figure 5B:
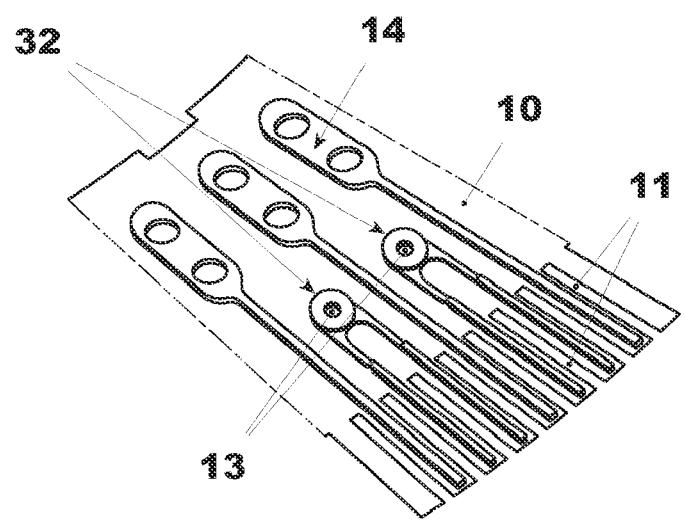

In the case of the exemplary embodiments of FIGS. 4 and 5, the assembled duct spacers 27 or 32 comprise in each case an upper part 28 and a lower part 29. The lower part 29 has a widened first section with a hole 21 for inserting the axial bolts of the laminated core, and also two narrow second sections in the form of radial fingers 22, 23 which lie next to each other in a spaced apart manner. The upper part 28 is formed as a perforated disk. The perforated disk 28 and the first section 20 with the hole 21 arranged therein lie one above the other. Upper and lower section can also swap places.

For adjusting to the overall thickness of first section 20 and perforated disk 28 which lies above it, the fingers 22, 23 here are also constructed with double thickness compared with the first section 20, which is achieved by means of strip-like layers 30, 31 on the fingers 22, 23. The strips 30, 31 can be applied on the two fingers 22, 23 on the top (FIG. 4a). However, according to the example from FIG. 5(a) the strips can also be attached on the one finger 22 on the upper side and on the other finger 23 on the lower side if one of the fingers (23) is correspondingly vertically offset as a result of an S-shaped bend 33.

The duct spacers 14, 17, 24, 27, 32 in addition to the support on the bolts can be connected to the lamination segment 10 by means of welding, spot-welding or pinning.

LIST OF DESIGNATIONS

10 Lamination segment (rotor)
11 Slot-like cut-out
12 Bolt-hole (rim bolt)
13 Bolt-hole (clamping bolt)
14, 17, 24, 27, 32 Duct spacer
15 Hole section
16 Finger (radial)

18 Upper part
19 Lower part
20, 20' Hole section
21 Bolt-hole
22, 23 Finger (radial)
25, 26 Layer (strip-like)
28 Upper part
29 Lower part
30, 31 Layer (strip-like)
33 Bend (S-shaped)

What is claimed is:

1. A rotor for an electrodynamic machine comprising:
a laminated core including a plurality of lamination segments arranged in series in an axial direction wherein the laminated core includes cooling ducts formed by duct spacers disposed between axially adjacent lamination segments, wherein the duct spacers are configured to resist centrifugal forces acting on the duct spacers and arc supported by axial bolts extending through the laminated core in the axial direction,
wherein the at least one duct spacer is comprised of a plurality of individual parts at least partially axially adjacent to each other, and
wherein the plurality of individual parts includes a first part and a second part, the first part including a perforated disk, and the second part having a second widened Section with a hole configured to receive the axial bolt and a second narrow section in a form of at least two radial fingers disposed circumferentially next to and spaced apart from each other, wherein the perforated disk and the second widened section axe disposed axially adjacent to each other.

2. The rotor as recited in claim 1, wherein the duct spacers extend in a radial direction.

3. The rotor as recited in claim 1, wherein at least one of the duct spacers is integrally formed as a single piece and has a constant thickness.

4. The rotor as recited in claim 3, wherein at least one of the duct spacers is a single metal sheet.

5. The rotor as recited in claim 3, wherein at least one of the duct spacers includes widened section having at least one hole configured to receive the axial bolt and a narrow section in a form of a radial finger.

6. The rotor as recited in claim 1, wherein at least one of the duct spacers has a constant thickness.

7. The rotor as recited in claim 1, wherein the radial fingers each include a strip-like layer for providing the double thickness.

8. The rotor as recited in claim 1, wherein the at least two radial fingers have a double thickness compared with the second widened section so as to correspond to the overall thickness of the perforated disk and the second widened section disposed one axially adjacent to each other.

9. The rotor as recited in claim 1, wherein the plurality of lamination segments each include an outer periphery having at least two radial slot-like cutouts disposed so as to form portions of at least two winding slots in the laminated core, and wherein at least one duct spacer extends radially up to and between the at least two radial slot-like cutouts.

10. The rotor as recited in claim 1, wherein the duct spacers are connected to the lamination segments by means of at least one of welding, spot-welding and pinning so as to support the axial bolts.

11. A rotor for an electrodynamic machine comprising:
a laminated core including a plurality of lamination segments arranged in series in an axial direction, wherein the laminated core includes cooling ducts formed by duct spacers disposed between axially adjacent lamination segments, wherein the duct spacers are configured to resist centrifugal forces acting on the duct spacers and are supported by axial bolts extending through the laminated core in the axial direction,
wherein at least one of duct spacers is comprised of a plurality of individual parts at least partially axially adjacent to each other, and
wherein the plurality of individual parts includes a first part and a second part, the first part having a first widened section with a hole configured to receive the axial bolt and a first narrow section in a form of a first radial finger, and the second part having a second widened section with a hole configured to receive the axial bolt and a second narrow section in a form of a second radial finger, wherein the first and second widened sections are disposed axially adjacent to each other and the first and second radial fingers are disposed circumferentially next to and spaced apart from each other, and
wherein the first and the second radial fingers have a double thickness compared with the first and the second widened sections, respectively, so as to correspond to the overall thickness of the first and the second widened sections disposed axially adjacent to each other.

12. The rotor as recited in claim 11, wherein the duct spacers extend in a radial direction.

13. The rotor as recited in claim 11, wherein at least one of the duct spacers is integrally formed as a single piece and has a constant thickness.

14. The rotor as recited in claim 13, wherein the at least one of the duct spacers is a single metal sheet.

15. The rotor as recited in claim 13, wherein the at least one of the duct spacers includes a widened section having at least one hole configured to receive the axial bolt, the at least one duct spacer further including a narrow section in a form of a radial finger.

16. The rotor as recited in claim 11, wherein the at least one of the duct spacers has a constant thickness.

17. The rotor as recited in claim 11, wherein the radial fingers each include a strip-like layer for providing the double thickness.

18. The rotor as recited in claim 11, wherein the plurality of lamination segments each include an outer periphery having at least two radial slot-like cutouts disposed so as to form portions of at least two winding slots in the laminated core, and wherein at least one duct spacer extends radially up to and between the at least two radial slot-like cutouts.

19. The rotor as recited in claim 11, wherein the duct spacers are connected to the lamination segments by means of at least one of welding, spot-welding and pinning so as to support the axial bolts.

* * * * *